United States Patent
Yatabe et al.

(10) Patent No.: US 12,468,026 B2
(45) Date of Patent: Nov. 11, 2025

(54) POSITION DETERMINATION DEVICE

(71) Applicant: MINEBEA MITSUMI Inc., Nagano (JP)

(72) Inventors: Noriyuki Yatabe, Hiroshima (JP); Kohei Yamaguchi, Hiroshima (JP); Junichi Igawa, Hiroshima (JP)

(73) Assignee: MINEBEA MITSUMI Inc., Nagano (JP)

( * ) Notice: Subject to any disclaimer, the term of this patent is extended or adjusted under 35 U.S.C. 154(b) by 92 days.

(21) Appl. No.: 18/600,966

(22) Filed: Mar. 11, 2024

(65) Prior Publication Data
US 2025/0020793 A1  Jan. 16, 2025

(30) Foreign Application Priority Data
Jul. 14, 2023  (JP) .................. 2023-116189

(51) Int. Cl.
*G01S 13/76*  (2006.01)
*G01S 13/87*  (2006.01)

(52) U.S. Cl.
CPC .......... *G01S 13/765* (2013.01); *G01S 13/878* (2013.01)

(58) Field of Classification Search
CPC ............... G01S 13/765; G01S 13/878; G01S 2013/466; G01S 5/02; H04W 4/023; H04W 4/025; H04W 64/00
See application file for complete search history.

(56) References Cited

U.S. PATENT DOCUMENTS

2022/0167117 A1* 5/2022 Hirose et al. ......... H04W 4/023
2023/0051782 A1  2/2023 Ohashi et al.

FOREIGN PATENT DOCUMENTS

JP  2021-148740 A  9/2021

* cited by examiner

*Primary Examiner* — Brodie J Follman
(74) *Attorney, Agent, or Firm* — Chrisman Gallo Tochtrop LLC

(57) ABSTRACT

A position determination device includes: a communication unit including communication devices to perform wireless communication with a mobile terminal 1, the communication devices to repeatedly perform UWB communication for detecting a distance measurement value Vr, at least one of the communication devices being configured to repeatedly perform BLE communication for receiving the movement value Vm; a main position determination unit to determine a first coordinate position Pf(n) as a position of the mobile terminal, based on distance measurement values Vr; a sub-position determination unit to determine a second coordinate position Ps(n) as a position of the mobile terminal 1, based on the movement value Vm; and a determination position setting unit to set any one of the first coordinate position Pf(n) and the second coordinate position Ps(n) as a determination coordinate position Pj(n) that is a current position of the mobile terminal.

14 Claims, 10 Drawing Sheets

POSITION DETERMINATION DEVICE

TECHNICAL FIELD

The present invention relates to a position determination device.

BACKGROUND ART

The position determination device disclosed in JP 2021-148740 A can determine the position of the occupant with respect to the vehicle and is used, for example, to detect a predetermined motion of the occupant and control the in-vehicle apparatus. This position determination device performs wireless communication between a mobile device carried by an occupant and a plurality of communication devices mounted on a vehicle, and determines a position of the mobile device with respect to the vehicle from a plurality of distance measurement values (distances) obtained from a communication result.

SUMMARY

When an obstacle obstructing wireless communication is present between the vehicle and the mobile device, or the like, distance measurement by wireless communication may not be performed between some of the plurality of communication devices and the mobile device. When the number of obtained distance measurement values is less than the set number, the position determination of the mobile device cannot be performed. The position determination when a set number or more of distance measurement values cannot be obtained as described above is not considered at all in JP 2021-148740 A.

An object of the present invention is to provide a position determination device capable of determining the position of a mobile device even when a set number or more of distance measurement values cannot be obtained.

One aspect of the present invention provides a position determination device including: a communication unit including a plurality of communication devices configured to perform wireless communication with a mobile terminal including a movement detection unit configured to detect a movement value including a movement amount and a movement angle, each of the plurality of communication devices configured to repeatedly perform first wireless communication for detecting a distance measurement value with respect to the mobile terminal, at least one of the plurality of communication devices configured to repeatedly perform second wireless communication for receiving the movement value; a main position determination unit configured to determine a first coordinate position, which is a position of the mobile terminal, based on a plurality of distance measurement values obtained by the first wireless communication; a sub-position determination unit configured to determine a second coordinate position, which is a position of the mobile terminal, based on the movement value obtained by the second wireless communication; and a determination position setting unit configured to set any one of the first coordinate position and the second coordinate position as a determination coordinate position that is a current position of the mobile terminal.

When the number of distance measurement values obtained from the communication results of the plurality of communication devices is less than the set number, the main position determination unit cannot determine the first coordinate position, but the sub-position determination unit can determine the second coordinate position based on the movement value detected by the movement detection unit included in the mobile terminal. Therefore, even when the obstacle that obstructs the wireless communication between the plurality of communication devices and the mobile terminal is present and the set number or more of the distance measurement values cannot be obtained by the wireless communication, the coordinate position of the mobile terminal can be determined.

In the present invention, the position of the mobile device can be determined even when a set number or more of the distance measurement values cannot be obtained.

DETAILED DESCRIPTION

Hereinafter, embodiments of the present invention will be described with reference to the accompanying drawings.

Figure 2:
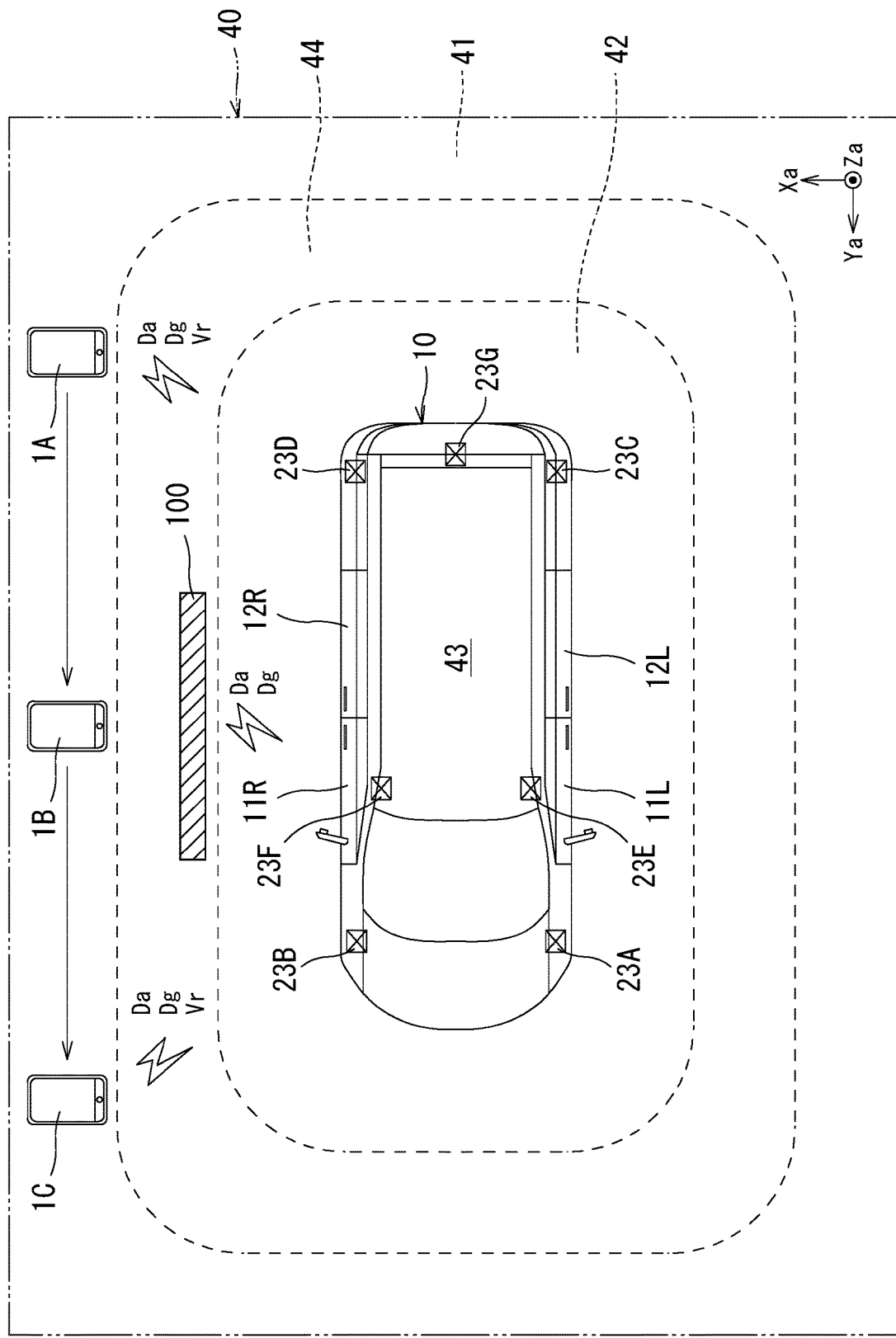
FIG. 2 is a plan view of a vehicle for illustrating a plurality of regions related to the control of an in-vehicle apparatus.
Figure 3:
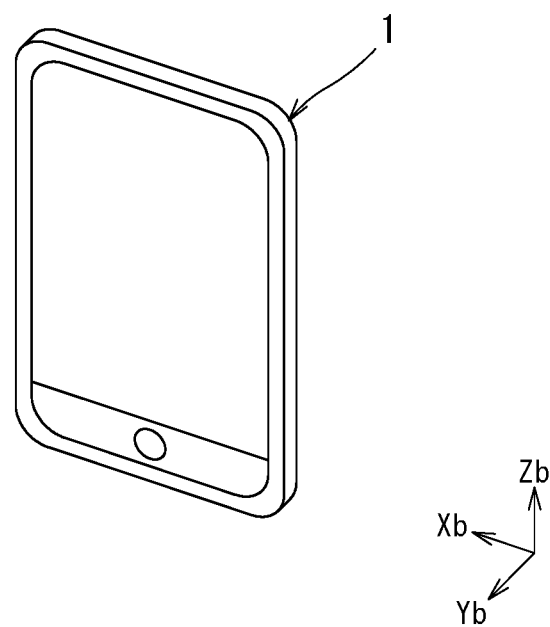
FIG. 3 is a perspective view showing the coordinate system of a mobile device.

In FIG. 2, an Xa direction indicates the vehicle width direction of the vehicle 10, a Ya direction indicates the vehicle length direction of the vehicle 10, and a Za direction indicates the vehicle height direction of the vehicle 10. In FIG. 3, an Xb direction indicates the width direction of the mobile device 1, a Yb direction indicates the thickness direction of the mobile device 1, and a Zb direction indicates the length direction of the mobile device 1. The Xa direction, the Ya direction, and the Za direction of the vehicle 10 shown in FIG. 2 hardly coincide with the Xb direction, the Yb direction, and the Zb direction of the mobile device 1 shown in FIG. 3. When the attitude of the mobile device 1 changes, the Xb direction, the Yb direction, and the Zb direction of the mobile device 1 with respect to the Xa direction, the Ya direction, and the Za direction of the vehicle 10 also change.

Figure 1:
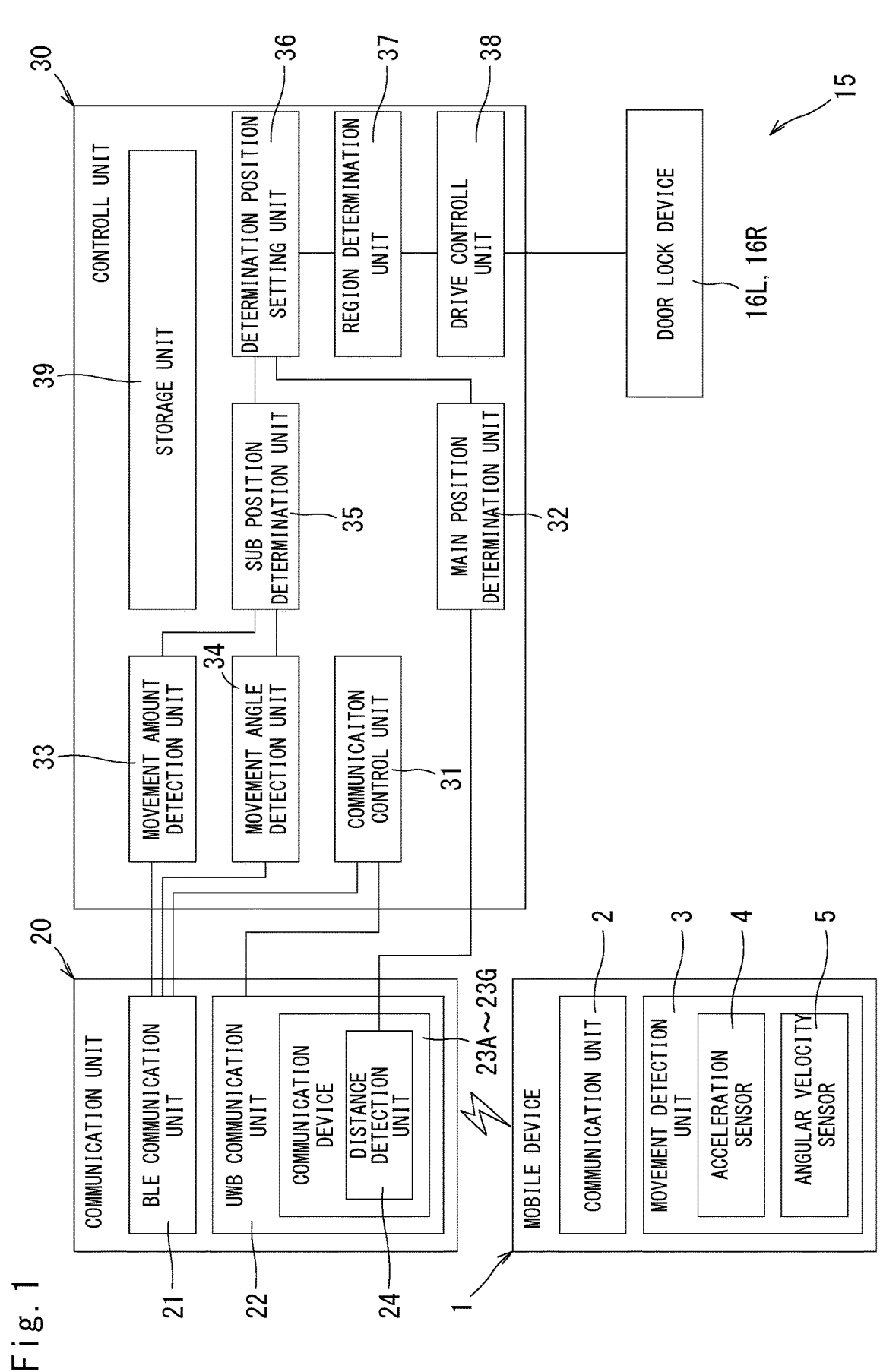
FIG. 1 is a block diagram of a vehicle control device in which a position determination device according to an embodiment of the present invention is incorporated.

Referring to FIG. 1, a vehicle control device 15 in which a position determination device according to an embodiment of the present invention is incorporated includes a communication unit 20 and a control unit 30, and is mounted on the vehicle 10 shown in FIG. 2. The control unit 30 can be constructed by hardware including a central processing unit (CPU) and storage devices such as a random access memory (RAM) and a read-only memory (ROM), and software mounted thereon.

Referring to FIG. 2, the vehicle 10 in the present embodiment is what is called a one-box type passenger vehicle, and includes left and right front doors 11L and 11R which are normal horizontal turning types, and left and right rear doors 12L and 12R which are sliding doors. Referring also to FIG. 1, the vehicle 10 includes door locking devices (in-vehicle apparatuses) 16L and 16R that can bring the left and right front doors 11L and 11R and the left and right rear doors 12L and 12R into a locked state (an opening/closing motion inoperable state) when fully closed and fully opened, respectively, and switch the locked state to an unlocked state in which an opening/closing motion is available.

Referring to FIG. 1, the vehicle control device 15 determines the coordinate position of the mobile device 1 with respect to the vehicle 10 by performing wireless communication with the mobile device 1 carried by the occupant, and controls the door locking devices 16L and 16R.

In the mobile devices 1A and 1C shown on both the left and right sides in FIG. 2, since there is no obstacle 100 such as a wall that obstructs wireless communication between the vehicle 10 and the mobile devices 1A and 1C, it is possible to determine the coordinate position (first coordinate position $Pf(n)$) of the mobile devices 1A and 1C. In the mobile device 1B shown in the center in FIG. 2, since an obstacle 100 is present between the vehicle 10 and the mobile device 1, the coordinate position (first coordinate position $Pf(n)$) of the mobile device 1B may not be determined. In addition, an inappropriate coordinate position (first coordinate position $Pf(n)$) may be determined due to false detection. In such a situation, in the present embodiment, the estimated coordinate position (second coordinate position $Ps(n)$) is set as the coordinate position (determination coordinate position $Pj(n)$) of the mobile device 1 by pedestrian dead reckoning (PDR) using the sensor information included in the mobile device 1.

Hereinafter, the communication unit 20 and the control unit 30 included in the mobile device 1 and the vehicle control device 15 will be specifically described.

Referring to FIG. 1, the mobile device 1 includes a communication unit 2 and a movement detection unit 3.

As with the communication unit 20 of the vehicle control device 15 to be described in detail below, the communication unit 2 includes a BLE communication unit (second wireless communication) that performs Bluetooth Low Energy (BLE, registered trademark) communication, and a UWB communication unit that performs Ultra-Wide Band (UWB) communication (first wireless communication) that is ultra-wide area wireless communication.

The movement detection unit 3 includes an acceleration sensor (movement amount detection unit) 4 for detecting a movement amount $Am(n)$ of the mobile device 1 and an angular velocity sensor (movement angle detection unit) 30 for detecting a movement angle $\theta g(n)$ of the mobile device 1. The movement detection unit 3 may further include a different sensor in addition to the acceleration sensor 4 and the angular velocity sensor 5.

The acceleration sensor 4 transmits information (detection result) on the detected movement amount $Am(n)$ to the communication unit 20 of the vehicle control device 15 through the communication unit 2. The angular velocity sensor 5 transmits information (detection result) on the detected movement angle $\theta g(n)$ to the communication unit 20 of the vehicle control device 15 through the communication unit 2. That is, the movement detection unit 3 transmits the movement value $Vm(n)$ including the movement amount $Am(n)$ and the movement angle $\theta g(n)$ to the communication unit 20 of the vehicle control device 15 by BLE communication through the communication unit 2 (see FIG. 4).

As the mobile device 1 having the above configuration, a smartphone or a mobile information terminal can be used. However, a specific configuration of the mobile device 1 is not particularly limited as long as the mobile device 1 is a mobile terminal capable of executing BLE communication and UWB communication.

Subsequently, referring to FIG. 1, the communication unit 20 of the vehicle control device 15 includes a BLE communication unit 21 and a UWB communication unit 22.

Figure 4:
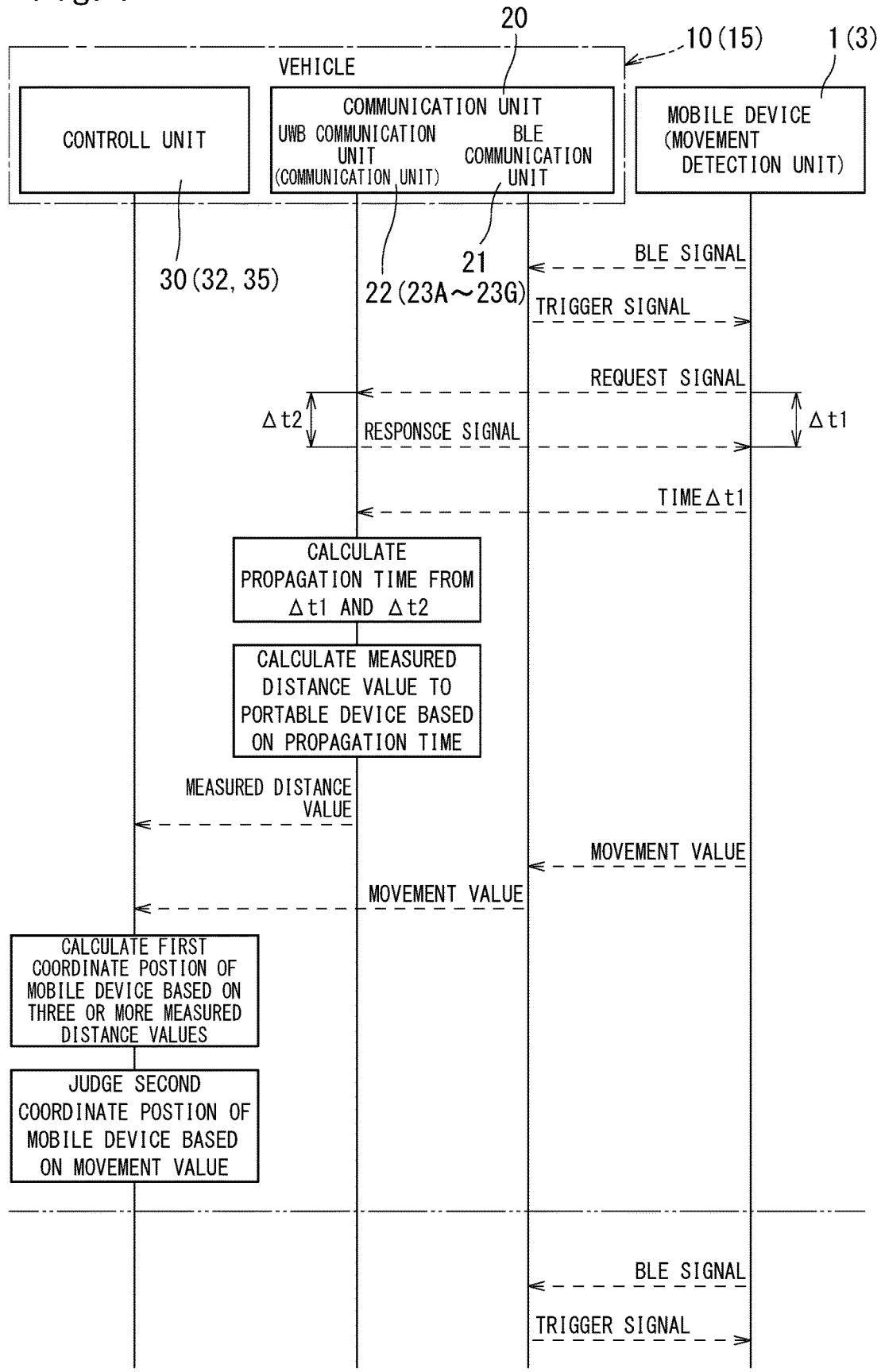
FIG. 4 is a sequence diagram showing communication between a communication unit of a vehicle and a mobile device.

Referring to FIGS. 1 and 4, the BLE communication unit 21 repeatedly performs the BLE communication with the mobile device 1 carried by the occupant according to a command of the communication control unit 31 to be described in detail below. The BLE communication unit 21 transmits, to the control unit 30, information on the movement value $Vm(n)$ including the movement amount $Am(n)$ and the movement angle $\theta g(n)$ input from the movement detection unit 3 through the communication unit 2.

In the present embodiment, the UWB communication unit 22 includes seven communication devices 23A, 23B, 23C, 23D, 23E, 23F, and 23G. Each of these communication devices 23A to 23G repeatedly performs UWB communication with the mobile device 1 carried by the occupant according to a command of the communication control unit 31. Referring to FIG. 2, the communication devices 23A and 23B are disposed on both sides in the vehicle width direction (for example, front bumper both end portions) of the front portion of the vehicle 10. The communication devices 23C and 23D are disposed on both sides in the vehicle width direction (for example, rear bumper both end portions) of the rear portion of the vehicle 10. The communication devices 23E and 23F are disposed on both sides (for example, front pillars) in the vehicle width direction in the front of the vehicle interior. The communication device 23G is disposed at the center in the vehicle width direction (for example, a rear window) in the rear of the vehicle interior.

Referring to FIGS. 1 and 4, each of the communication devices 23A to 23G includes a distance detection unit 24. Based on the communication time (communication result) of each of the communication devices 23A to 23G, the distance detection unit 24 calculates a distance measurement value (distance) Vr from the corresponding one of the communication devices 23A to 23G to the mobile device 1. A specific method of calculating the distance measurement value Vr will be described in detail below. The distance detection unit 24 transmits information on the calculated distance measurement value Vr to the control unit 30 by UWB communication. However, the distance detection unit 24 may be included by the control unit 30.

Subsequently, referring to FIG. 1, the control unit 30 includes a communication control unit 31, a main position determination unit 32, a movement amount detection unit 33, a movement angle detection unit 34, a sub-position determination unit 35, a determination position setting unit 36, a region determination unit 37, a drive control unit 38, and a storage unit 39. The communication control unit 31, the main position determination unit 32, the movement amount detection unit 33, the movement angle detection unit 34, the sub-position determination unit 35, the determination position setting unit 36, the region determination unit 37, and the drive control unit 38 refer to the information stored in the storage unit 39 as necessary in the processing executed by these units described below. The storage unit 39 stores information related to the regions 41 to 44 (see FIG. 2) used when the region determination unit 37 executes the determination.

The communication control unit 31 controls the communication with the mobile device 1 performed by the BLE communication unit 21 and the UWB communication unit 22 of the communication unit 20 as follows.

As shown in FIG. 4, when the intensity of the BLE signal received by the BLE communication unit 21 from the mobile device 1 becomes equal to or greater than a predetermined threshold value, that is, when the mobile device 1 carried by the occupant approaches the vehicle 10 to a predetermined distance, the BLE communication unit 21 transmits a trigger signal to the mobile device 1 (second wireless communication). The mobile device 1 having received the trigger signal transmits a request signal to each of the communication devices 23A to 23G of the UWB communication unit 22 (first wireless communication). When receiving the request signal from the mobile device 1, each of the communication devices 23A to 23G transmits a response signal to the mobile device 1. When receiving the response signal from each of the communication devices 23A to 23G, the mobile device 1 calculates a time $\Delta t1$ from when the request signal is transmitted to when the response signal is received, and transmits information on the time $\Delta t1$ to each of the communication devices 23A to 23G. Each of the communication devices 23A to 23G calculates a time $\Delta t2$ from receiving the request signal to transmitting the response signal. Each of the communication devices 23A to 23G calculates a propagation time of a signal between the corresponding one of the communication devices 23A to 23G and the mobile device 1 from the times $\Delta t1$ and $\Delta t2$, and outputs information on the propagation time to the distance detection unit 24. The distance detection unit 24 multiplies the input propagation time by the speed of the signal to calculate the distance measurement value Vr from each of the communication devices 23A to 23G to the mobile device 1, and transmits information on the distance measurement value Vr to the main position determination unit 32 of the control unit 30.

Referring to FIGS. 1 and 2, the main position determination unit 32 determines the first coordinate position Pf(n), which is the position of the mobile device 1 with respect to the vehicle 10, based on the distance measurement value Vr from each of the communication devices 23A to 23G to the mobile device 1 input from the distance detection unit 24. That is, the main position determination unit 32 determines the first coordinate position Pf(n) of the mobile device 1 with respect to the vehicle 10 based on the plurality of distance measurement values Vr obtained from the communication result of each of the plurality of communication devices 23A to 23G. In the present embodiment, the first coordinate position Pf(n) is determined by trilateration. However, the method of determining the first coordinate position Pf(n) of the mobile device 1 by the main position determination unit 32 can be changed as necessary as long as the determination can be made based on the plurality of distance measurement values Vr.

When the number of distance measurement values Vr obtained from the communication results of the communication devices 23A to 23G is less than a predetermined set number (three in the present embodiment), the main position determination unit 32 cannot determine the first coordinate position Pf(n) of the mobile device 1 with respect to the vehicle 10. On the other hand, when the number of distance measurement values Vr obtained from the communication results of the communication devices 23A to 23G is equal to or larger than the set number, the main position determination unit 32 determines the first coordinate position Pf(n) of the mobile device 1 with respect to the vehicle 10 based on these distance measurement values Vr. Information on the determined first coordinate position Pf(n) of the mobile device 1 is input to the determination position setting unit 36.

Here, when the number of distance measurement values Vr obtained from the communication results of the communication devices 23A to 23G is larger than a predetermined set number (three in the present embodiment), the main position determination unit 32 determines the first coordinate position Pf(n) as follows. For example, when four distance measurement values Vr are obtained, four sets of distance measurement value set obtained by selecting three from the four distance measurement values Vr are set. Then, the first coordinate position Pf(n) is determined for each of the four sets of distance measurement value set, and the average value of these first coordinate positions Pf(n) is determined as one first coordinate position Pf(n) of the mobile device 1. That is, when the number of the obtained distance measurement values Vr is equal to or larger than the set number, the distance measurement values Vr are grouped into sets each having three distance measurement values Vr, and the average value of the determination results in all the sets is set as the first coordinate position Pf(n) of the mobile device 1.

The movement amount detection unit 33 calculates the movement amount Am(n) of the mobile device 1 based on the acceleration data Da (detection result) of the acceleration sensor 4 of the mobile device 1 input from the BLE communication unit 21. Information on the calculated movement amount Am(n) is input to the sub-position determination unit 35.

The movement angle detection unit 34 calculates the movement angle $\theta g(n)$ of the mobile device 1 based on the angular velocity data Dg (detection result) of the angular velocity sensor 5 of the mobile device 1 input from the BLE communication unit 21. Information on the calculated movement angle $\theta g(n)$ is input to the sub-position determination unit 35.

When the movement amount Am(n) of the mobile device 1 input from the movement amount detection unit 33 is greater than or equal to a predetermined threshold value T (for example, 50 cm), the sub-position determination unit 35 determines the second coordinate position Ps(n) that is the position of the mobile device 1 with respect to the vehicle 10. The second coordinate position Ps(n) is determined by estimating the movement amount and the movement direction of the mobile device 1 based on the movement value Vm(n) input from the movement detection unit 3 of the mobile device 1, more specifically, the movement amount Am(n) and the movement angle $\theta g(n)$ obtained from the detection results of the acceleration sensor 4 and the angular velocity sensor 5. Details are as follows.

Figure 5:
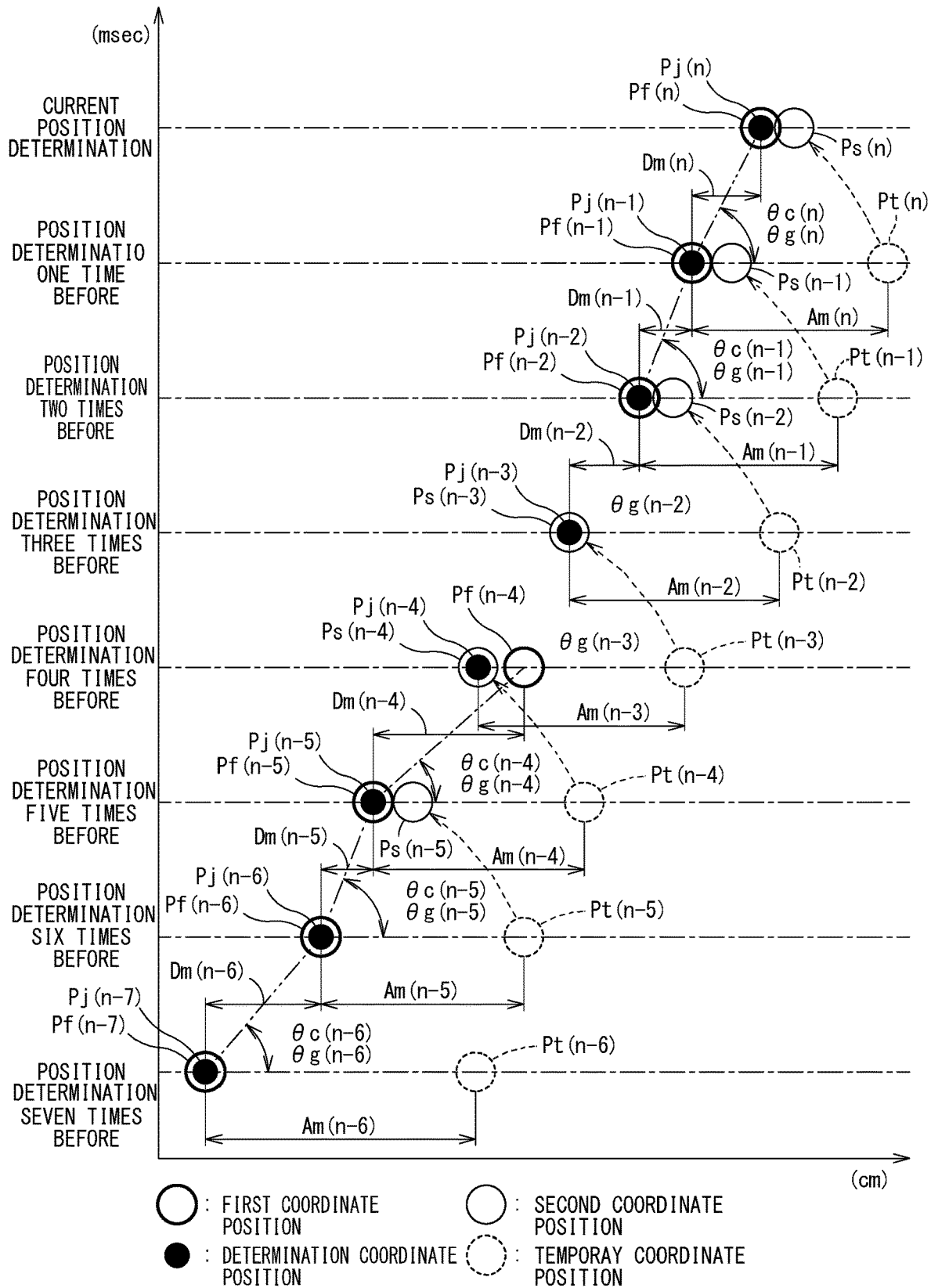
FIG. 5 is a diagram showing a setting method of a determination coordinate position.

Referring to FIG. 5, the second coordinate position Ps(n) is determined based on the one-time-before (last time) determination coordinate position Pj(n−1) set by the determination position setting unit 36, the movement amount Am(n) of the mobile device 1 input from the movement amount detection unit 33, the movement angle $\theta g(n)$ of the mobile device 1 input from the movement angle detection unit 34, and the latest correction angle $\theta c(n-\alpha)$ that has already been set. In the example shown in FIG. 5, the latest correction angle $\theta c(n-\alpha)$ that has already been set is the correction angle θc(n−1) set in the position determination one time before (before the last-time position determination).

First, the sub-position determination unit 35 adds the movement amount Am(n) of the mobile device 1 to the last-time determination coordinate position Pj(n−1) to set the temporary coordinate position Pt(n). Subsequently, the sub-position determination unit 35 determines the second coordinate position Ps(n) by correcting the temporary coordinate position Pt(n) based on the movement angle θg(n) of the mobile device 1 and the latest correction angle θc(n−1) out of the correction angles θc(n−1, 4 to 6) set before the last-time position determination. The determined second coordinate position Ps(n) of the mobile device 1 is input to the determination position setting unit 36.

The correction angle θc(n) is set by the sub-position determination unit 35 based on the two first coordinate positions Pf(n, n−1) continuously determined by the main position determination unit 32, that is, the this-time first coordinate position Pf(n) and the last-time first coordinate position Pf(n−1). More specifically, let the last-time first coordinate position Pf(n−1) determined by the main position determination unit 32 be X1 and Y1 and let the this-time first coordinate position Pf(n) be X2 and Y2, the correction angle θc(n) is calculated by the following Formula 1:

$$\theta c(n) = \arctan((Y2 - Y1)/(X2 - X1)) * 180°/\pi \quad (1)$$

X1: X coordinate of last-time first coordinate position Pf(n−1)
Y1: Y coordinate of last-time first coordinate position Pf(n−1)
X2: X coordinate of this-time first coordinate position Pf(n)
Y2: Y coordinate of this-time first coordinate position Pf(n)

When the temporary coordinate position Pt(n) is corrected to the second coordinate position Ps(n) in the this-time position determination, the latest correction angle θc(n−1) is used out of the correction angles θc(n−1, 4 to 6) set in the position determination before the this-time position determination as described above. This is because when the set number or more of the distance measurement values Vr cannot be obtained in the this-time position determination, the first coordinate position Pf(n) cannot be determined and the correction angle θc(n) cannot be set, either.

Let the set temporary coordinate position Pt(n) be X3 and Y3, X4 and Y4 which are the second coordinate position Ps(n) are calculated by the following Formula 2:

$$X4 = X3 * \cos(\theta c(n-1) + \theta g(n)) - Y3 * \sin(\theta c(n-1) + \theta g(n)) \quad (2)$$
$$Y4 = Y3 * \cos(\theta c(n-1) + \theta g(n)) + X3 * \sin(\theta c(n-1) + \theta g(n))$$

X4: X coordinate of second coordinate position Ps(n)
Y4: Y coordinate of second coordinate position Ps(n)
X3: X coordinate of temporary coordinate position Pt(n)
Y3: Y coordinate of temporary coordinate position Pt(n)
θc(n−1): latest correction angle already set
θg(n): movement angle of mobile device Formula 2 is a computing equation for correcting the temporary coordinate position Pt(n) to the second coordinate position Ps(n) by adjusting the Xa coordinate, the Ya coordinate, and the Za coordinate of the vehicle 10 shown in FIG. 2 to match the Xb coordinate, the Yb coordinate, and the Zb coordinate of the mobile device 1 shown in FIG. 3. Here, when the attitude of the mobile device 1 carried by the occupant does not change, the Xa coordinate, the Ya coordinate, and the Za coordinate of the vehicle 10 coincide with the Xb coordinate, the Yb coordinate, and the Zb coordinate of the mobile device 1. However, when the attitude of the mobile device 1 carried by the occupant changes, a deviation occurs between the Xa coordinate, the Ya coordinate, and the Za coordinate of the vehicle 10 and the Xb coordinate, the Yb coordinate, and the Zb coordinate of the mobile device 1. Therefore, the Xa coordinate, the Ya coordinate, and the Za coordinate of the vehicle 10 are adjusted to coincide with the Xb coordinate, the Yb coordinate, and the Zb coordinate of the mobile device 1 shown in FIG. 3 by adding the latest correction angle θc(n−1) already set to the movement angle θg(n) from the mobile device 1, and the temporary coordinate position Pt(n) is corrected to determine the second coordinate position Ps(n). Consequently, the determination accuracy of the second coordinate position Ps(n) that is the estimated position of mobile device 1 is improved. The second coordinate position Ps(n) thus determined is less accurate than the first coordinate position Pf(n) determined by the main position determination unit 32, but can be determined within a range of tolerance.

Referring to FIGS. 1 and 5, the determination position setting unit 36 sets any one of the first coordinate position Pf(n) determined by the main position determination unit 32 and the second coordinate position Ps(n) determined by the sub-position determination unit 35 as the determination coordinate position Pj(n) that is the current position of the mobile device 1. More specifically, when the number of the distance measurement values Vr obtained from the communication results of the plurality of communication devices 23A to 23G is equal to or larger than a set number (three in the present embodiment) and the first coordinate position Pf(n) is appropriate, the determination position setting unit 36 sets the first coordinate position Pf(n) as the determination coordinate position Pj(n). On the other hand, when the number of distance measurement values Vr obtained from the communication results of the plurality of communication devices 23A to 23G is less than the set number and when the first coordinate position Pf(n) is inappropriate, the determination position setting unit 36 sets the second coordinate position Ps(n) as the determination coordinate position Pj(n). The set determination coordinate position Pj(n) of the mobile device 1 is input to the region determination unit 37.

The determination by the determination position setting unit 36 whether the first coordinate position Pf(n) is appropriate is performed based on the last-time determination coordinate position Pj(n−1) set by the determination position setting unit 36 and the this-time first coordinate position Pf(n) determined by the main position determination unit 32. More specifically, when the moving distance Dm(n), which is the difference between the last-time determination coordinate position Pj(n−1) and the this-time first coordinate position Pf(n), is equal to or less than the set distance Ds, the determination position setting unit 36 determines that the first coordinate position Pf(n) is appropriate. On the other hand, when the moving distance Dm(n) is longer than the set distance Ds, that is, when the moving speed of the occupant carrying the mobile device 1 indicates an abnormal state that cannot be normal, the determination position setting unit 36 determines that the first coordinate position Pf(n) is inappropriate. The set distance Ds is set in a range of 10 cm or more and 100 cm or less and is set to 50 cm in the present embodiment.

Based on the input determination coordinate position Pj(n) of the mobile device 1, the region determination unit 37 determines in which among the regions 41 to 44 shown in FIG. 2 stored in the storage unit 39 the mobile device 1 is positioned.

Referring to FIG. 2, the set region 41 to 44 includes a region (door control region group 40) used for controlling the door locking devices 16L and 16R. The door control region group 40 includes a door lock region 41, a door unlock region 42, an engine start permission region 43, and a dead zone region 44.

In the present embodiment, the door lock region 41 is set as a region away from the vehicle 10 by a certain distance or more, and the door unlock region 42 is set to surround the vehicle 10 at a position closer to the vehicle 10 by a certain distance than the door lock region 41. In addition, the engine start permission region 43 in the present embodiment is set in the vehicle interior of the vehicle 10. A dead zone region 44 is provided between the door lock region 41 and the door unlock region 42 to prevent a malfunction caused by setting the door lock region 41 and the door unlock region 42 adjacent to each other.

Which one of the regions 41 to 44 the mobile device 1 is positioned determined by the region determination unit 37 is input to the drive control unit 38.

The drive control unit 38 controls door locking devices 16L and 16R included in the vehicle 10 based on which one of the regions 41 to 44 the mobile device 1 is positioned and the movement of the mobile device 1 between the regions 41 to 44 input from the region determination unit 37. When the UWB communication between the communication devices 23A to 23G and the mobile device 1 described above is started, which one of the regions 41 to 44 the mobile device 1 is positioned in is periodically input to the drive control unit 38 from the region determination unit 37.

Next, an example of the determination of the second coordinate position Ps(n) by the sub-position determination unit 35 and the setting of the determination coordinate position Pj(n) by the determination position setting unit 36 will be described with reference to FIG. 5.

FIG. 5 shows position determination for eight times. In FIG. 5, the vertical axis represents time (msec), and the horizontal axis represents distance (cm). In FIG. 5, the 7-time-before position determination positioned at the lowermost is the first (oldest) position determination, the upper the position is, the sequentially newer the position determination is, and the uppermost position is the this-time position determination.

In FIG. 5, the first coordinate position Pf(n), the second coordinate position Ps(n), the determination coordinate position Pj(n), the temporary coordinate position Pt(n), the movement amount Am(n), the movement angle $\theta g(n)$, the correction angle $\theta c(n)$, and the moving distance Dm(n) are data in the this-time position determination. In FIG. 5, the first coordinate position Pf(n−1), the second coordinate position Ps(n−1), the determination coordinate position Pj(n−1), the temporary coordinate position Pt(n−1), the movement amount Am(n−1), the movement angle $\theta g(n-1)$, the correction angle $\theta c(n-1)$, and the moving distance Dm(n−1) are data by the 1-time-before (last-time) position determination. In FIG. 5, the first coordinate position Pf(n−2), the second coordinate position Ps(n−2), the determination coordinate position Pj(n−2), the temporary coordinate position Pt(n−2), the movement amount Am(n−2), the movement angle $\theta g(n-2)$, the correction angle $\theta c(n-2)$, and the moving distance Dm(n−2) are data by the 2-time-before (the time before last) position determination. As described above, the ordinal number of the number of determinations n or less increases as it becomes older. These pieces of data are stored in the storage unit 39, for example, for 10 times. Data for more than 10 times is erased. In addition, these pieces of data are reset (erased), for example, when the engine of the vehicle 10 is started.

In FIG. 5, the 7-time-before (first) position determination, the 6-time-before (second) position determination, the 5-time-before (third) position determination, the 2-time-before (sixth) position determination, the 1-time-before (seventh) position determination, and the this-time (eighth) position determination indicate cases where three or more distance measurement values Vr are obtained by the communication devices 23A to 23G. The 4-time-before (fourth) position determination indicates a case where three or more distance measurement values Vr have been obtained by the communication devices 23A to 23G, but there is an abnormality in the distance measurement values Vr. The 3-time-before (fifth) position determination indicates a case where three or more distance measurement values Vr cannot be obtained by the communication devices 23A to 23G. Hereinafter, these position determinations will be sequentially described.

In the 7-time-before (first) position determination, first, the main position determination unit 32 determines the first coordinate position Pf(n−7) based on three or more distance measurement values Vr. At this time, since the determination coordinate position Pj and the correction angle $\theta c$ have not been set before, the sub-position determination unit 35 does not determine the second coordinate position Ps. Therefore, the determination position setting unit 36 sets the first coordinate position Pf(n−7) determined by main position determination unit 32 as the determination coordinate position Pj(n−7).

In the 6-time-before (second) position determination, the main position determination unit 32 determines the first coordinate position Pf(n−6) based on three or more distance measurement values Vr. On the other hand, the sub-position determination unit 35 adds the movement amount Am(n−6) of the mobile device 1 input from the movement amount detection unit 33 to the last-time determination coordinate position Pj(n−7) to set the temporary coordinate position Pt(n−6). However, in this state, since the correction angle $\theta c$ has not yet been set before, the sub-position determination unit 35 does not determine the second coordinate position Ps. Next, the sub-position determination unit 35 sets the correction angle $\theta c(n-6)$ based on the last-time first coordinate position Pf(n−7) and the this-time first coordinate position Pf(n−6). Lastly, since the moving distance Dm(n−6), which is a difference between the last-time determination coordinate position Pj(n−7) and the this-time first coordinate position Pf(n−6), is smaller than or equal to the set distance Ds, the determination position setting unit 36 determines that the first coordinate position Pf(n−6) determined by the main position determination unit 32 is appropriate. Therefore, the determination position setting unit 36 sets the first coordinate position Pf(n−6) as the determination coordinate position Pj(n−6).

In the 5-time-before (third) position determination, the main position determination unit 32 determines the first coordinate position Pf(n−5) based on three or more distance measurement values Vr. On the other hand, the sub-position determination unit 35 adds the movement amount Am(n−5) of the mobile device 1 input from the movement amount detection unit 33 to the last-time determination coordinate position Pj(n−6) to set the temporary coordinate position Pt(n−5). Thereafter, the sub-position determination unit 35 corrects the temporary coordinate position Pt(n−5) using the set latest correction angle θc(n−6) and the movement angle θg(n−5) of the mobile device 1 input from the movement angle detection unit 34, and determines the second coordinate position Ps(n−5). Next, the sub-position determination unit 35 sets the correction angle θc(n−5) based on the last-time first coordinate position Pf(n−6) and the this-time first coordinate position Pf(n−5). Lastly, since the moving distance Dm(n−5), which is a difference between the last-time determination coordinate position Pj(n−6) and the this-time first coordinate position Pf(n−5), is smaller than or equal to the set distance Ds, the determination position setting unit 36 determines that the first coordinate position Pf(n−5) determined by the main position determination unit 32 is appropriate. Therefore, the determination position setting unit 36 sets the first coordinate position Pf(n−5) as the determination coordinate position Pj(n−5).

In the 4-time-before (fourth) position determination, the main position determination unit 32 determines the first coordinate position Pf(n−4) based on three or more distance measurement values Vr. On the other hand, the sub-position determination unit 35 adds the movement amount Am(n−4) of the mobile device 1 input from the movement amount detection unit 33 to the last-time determination coordinate position Pj(n−5) to set the temporary coordinate position Pt(n−4). Thereafter, the sub-position determination unit 35 corrects the temporary coordinate position Pt(n−4) using the set latest correction angle θc(n−5) and the movement angle θg(n−4) of the mobile device 1 input from the movement angle detection unit 34, and determines the second coordinate position Ps(n−4). Next, the sub-position determination unit 35 sets the correction angle θc(n−4) based on the last-time first coordinate position Pf(n−5) and the this-time first coordinate position Pf(n−4). Lastly, since the moving distance Dm(n−4), which is a difference between the last-time determination coordinate position Pj(n−5) and the this-time first coordinate position Pf(n−4), is larger than the set distance Ds, the determination position setting unit 36 determines that the first coordinate position Pf(n−4) determined by the main position determination unit 32 is inappropriate. Therefore, the determination position setting unit 36 sets the second coordinate position Ps(n−4) determined by the sub-position determination unit 35 as the determination coordinate position Pj(n−4).

In the 3-time-before (fifth) position determination, since three or more distance measurement values Vr are not obtained, the main position determination unit 32 cannot determine the first coordinate position Pf(n−3). On the other hand, the sub-position determination unit 35 adds the movement amount Am(n−3) of the mobile device 1 input from the movement amount detection unit 33 to the last-time determination coordinate position Pj(n−4) to set the temporary coordinate position Pt(n−3). Thereafter, the sub-position determination unit 35 corrects the temporary coordinate position Pt(n−3) using the set latest correction angle θc(n−4) and the movement angle θg(n−3) of the mobile device 1 input from the movement angle detection unit 34, and determines the second coordinate position Ps(n−3). Next, since the this-time first coordinate position Pf(n−3) has not been determined, the sub-position determination unit 35 does not set the correction angle θc(n−3). Lastly, the determination position setting unit 36 sets the second coordinate position Ps(n−3) determined by the sub-position determination unit 35 as the determination coordinate position Pj(n−3).

In the 2-time-before (sixth) position determination, the main position determination unit 32 determines the first coordinate position Pf(n−2) based on three or more distance measurement values Vr. On the other hand, the sub-position determination unit 35 adds the movement amount Am(n−2) of the mobile device 1 input from the movement amount detection unit 33 to the last-time determination coordinate position Pj(n−3) to set the temporary coordinate position Pt(n−2). Thereafter, the sub-position determination unit 35 corrects the temporary coordinate position Pt(n−2) using the set latest correction angle θc(n−4) and the movement angle θg(n−2) of the mobile device 1 input from the movement angle detection unit 34, and determines the second coordinate position Ps(n−2). Next, since the last-time first coordinate position Pf(n−3) has not been determined, the sub-position determination unit 35 does not set the correction angle θc(n−2). Lastly, since the moving distance Dm(n−2), which is a difference between the last-time determination coordinate position Pj(n−3) and the this-time first coordinate position Pf(n−2), is smaller than or equal to the set distance Ds, the determination position setting unit 36 determines that the first coordinate position Pf(n−2) determined by the main position determination unit 32 is appropriate. Therefore, the determination position setting unit 36 sets the first coordinate position Pf(n−2) as the determination coordinate position Pj(n−2).

In the 1-time-before (seventh) position determination, the main position determination unit 32 determines the first coordinate position Pf(n−1) based on three or more distance measurement values Vr. On the other hand, the sub-position determination unit 35 adds the movement amount Am(n−1) of the mobile device 1 input from the movement amount detection unit 33 to the last-time determination coordinate position Pj(n−2) to set the temporary coordinate position Pt(n−1). Thereafter, the sub-position determination unit 35 corrects the temporary coordinate position Pt(n−1) using the set latest correction angle θc(n−4) and the movement angle θg(n−1) of the mobile device 1 input from the movement angle detection unit 34, and determines the second coordinate position Ps(n−1). Next, the sub-position determination unit 35 sets the correction angle θc(n−1) based on the last-time first coordinate position Pf(n−2) and the this-time first coordinate position Pf(n−1). Lastly, since the moving distance Dm(n−1), which is a difference between the last-time determination coordinate position Pj(n−2) and the this-time first coordinate position Pf(n−1), is smaller than or equal to the set distance Ds, the determination position setting unit 36 determines that the first coordinate position Pf(n−1) determined by the main position determination unit 32 is appropriate. Therefore, the determination position setting unit 36 sets the first coordinate position Pf(n−1) as the determination coordinate position Pj(n−1).

In the this-time (eighth) position determination, the main position determination unit 32 determines the first coordinate position Pf(n) based on three or more distance measurement values Vr. On the other hand, the sub-position determination unit 35 adds the movement amount Am(n) of the mobile device 1 input from the movement amount detection unit 33 to the last-time determination coordinate position Pj(n−1) to set the temporary coordinate position Pt(n). Thereafter, the sub-position determination unit 35 corrects the temporary coordinate position Pt(n) using the set latest correction angle θc(n−1) and the movement angle θg(n) of the mobile device 1 input from the movement angle detection unit 34, and determines the second coordinate position Ps(n). Next, the sub-position determination unit 35 sets the correction angle θc(n) based on the last-time first coordinate position Pf(n−1) and the this-time first coordinate position Pf(n). Lastly, since the moving distance Dm(n), which is a difference between the last-time determination coordinate position Pj(n−1) and the this-time first coordinate position Pf(n), is smaller than or equal to the set distance Ds, the determination position setting unit 36 determines that the first coordinate position Pf(n) determined by the main position determination unit 32 is appropriate. Therefore, the determination position setting unit 36 sets the first coordinate position Pf(n) as the determination coordinate position Pj(n).

As described above, in the present embodiment, three or more distance measurement values Vr are obtained by the communication devices 23A to 23G. However, in any of the case where there is an abnormality in the distance measurement value Vr (4-time-before position determination) and the case where three or more distance measurement values Vr cannot be obtained by the communication devices 23A to 23G (3-time-before position determination), the sub-position determination unit 35 can determine the second coordinate position Ps(n) and set the second coordinate position Ps(n) as the determination coordinate position Pj(n).

Next, position determination processing by the vehicle control device 15 will be described with reference to flowcharts shown in FIGS. 6 to 9.

Figure 6:
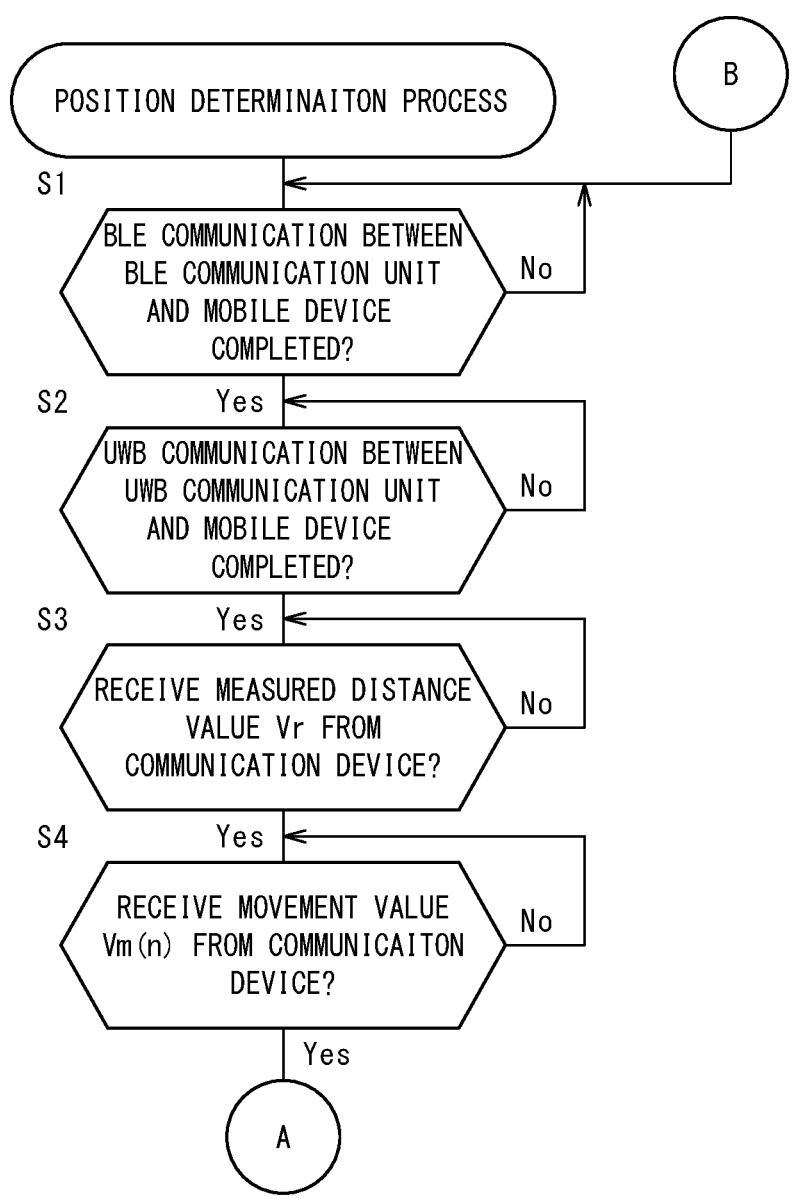
FIG. 6 is a flowchart showing position determination processing by a control unit.
Figure 7:
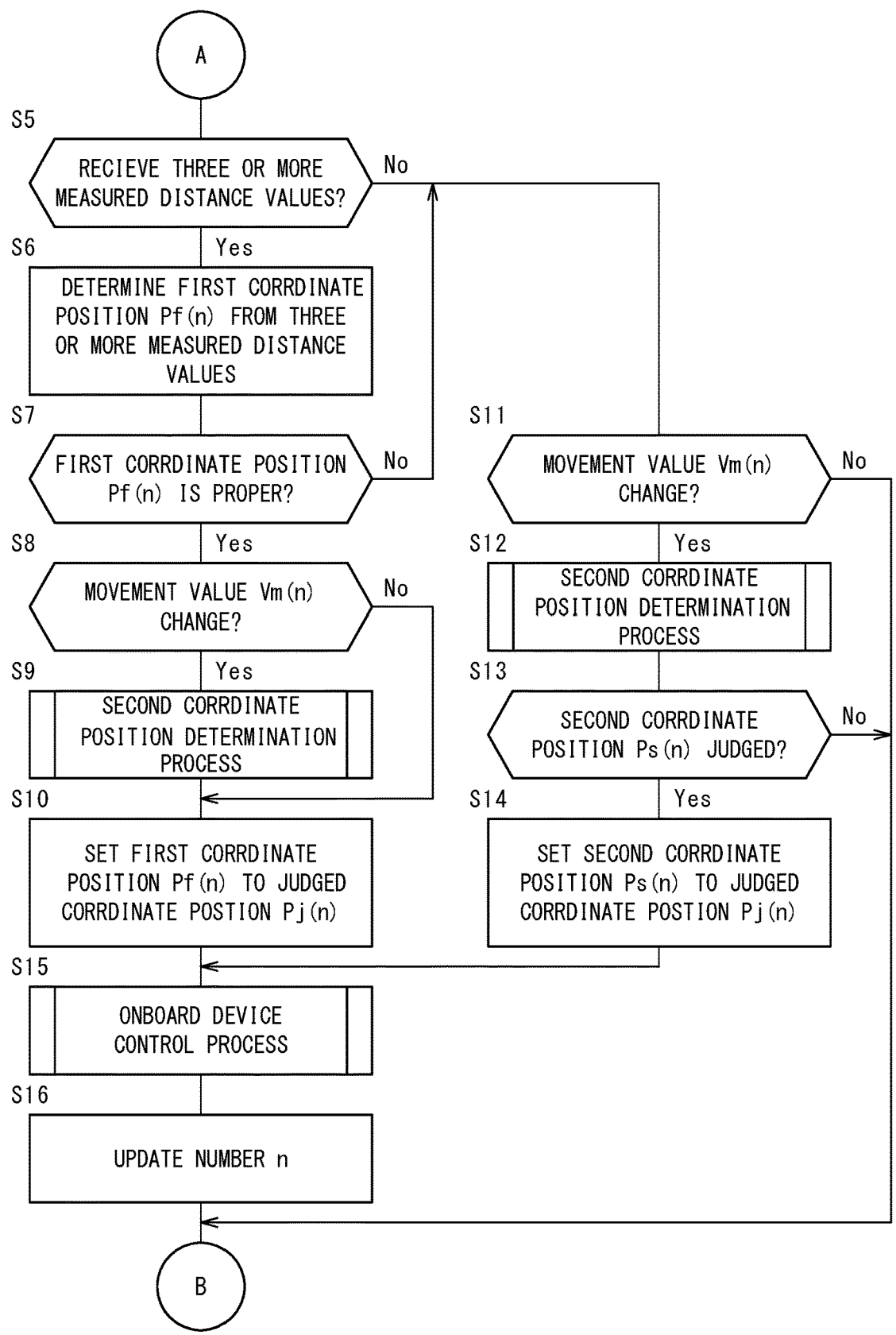
FIG. 7 is a flowchart following FIG. 6.

Referring to FIGS. 6 and 7, in the position determination processing, one position determination from step S1 to step S16 is repeatedly performed.

Specifically, as shown in FIG. 6, in step S1, the process waits until the BLE communication (second wireless communication) between the BLE communication unit 21 and the mobile device 1 is completed. That is, the process waits until a series of BLE communication in which the BLE communication unit 21 receives a BLE signal having a predetermined intensity or more from the mobile device 1 and outputs a trigger signal is completed.

If the BLE communication is completed, in step S2, the process waits until the UWB communication (first wireless communication) between the UWB communication unit 22 and the mobile device 1 is completed. That is, the process waits until a series of UWB communication in which each of the plurality of communication devices 23A to 23G receives a request signal from the mobile device 1, outputs a response signal, and receives information on the time Δt1 from the mobile device 1 is completed.

If the UWB communication is completed, in step S3, the process waits until the main position determination unit 32 receives the distance measurement values Vr from the communication devices 23A to 23G by the UWB communication (first wireless communication). If the distance measurement values Vr are received, in step S4, the process waits until the movement value Vm(n) is received from the mobile device 1, that is, until the movement amount detection unit 33 receives the movement amount Am(n) and the movement angle detection unit 34 receives the movement angle θg(n) by the BLE communication (second wireless communication).

If the movement value Vm(n) is received, as shown in FIG. 7, in step S5, the main position determination unit 32 determines whether three or more distance measurement values Vr have been received. If three or more distance measurement values Vr are received, the process proceeds to step S6, and if only less than three distance measurement values Vr have been received, the process proceeds to step S11.

In step S6, the first coordinate position Pf(n) is determined from three among the three or more distance measurement values Vr, and then, in step S7, it is determined whether the determined first coordinate position Pf(n) is appropriate. That is, it is determined whether the moving distance Dm(n) from the last-time determination coordinate position Pj(n−1) to the this-time first coordinate position Pf(n) is equal to or smaller than the set distance Ds (50 cm in the present embodiment). If the determined first coordinate position Pf(n) is appropriate, the process proceeds to step S8, and if the determined first coordinate position Pf(n) is inappropriate, the process proceeds to step S11.

In step S8, the sub-position determination unit 35 determines whether the movement amount Am(n) by the acceleration sensor 4 and the movement angle θg(n) by the angular velocity sensor 5 have changed, that is, whether the movement value Vm(n) of the mobile device 1 has changed due to the movement of the occupant. If the movement value Vm(n) of the mobile device 1 changes, the second coordinate position determination processing to be described in detail below is executed in step S9, and then the process proceeds to step S10. On the other hand, if the movement value Vm(n) of the mobile device 1 does not change in step S8, the process proceeds to step S10 without executing the second coordinate position determination processing in step S9.

In step S10, the determination position setting unit 36 sets the first coordinate position Pf(n) determined in step S6 as the this-time determination coordinate position Pj(n), and the process proceeds to step S15. That is, since the set number or more of distance measurement values Vr are obtained from the communication devices 23A to 23G in step S5 and the first coordinate position Pf(n) determined in step S7 is appropriate, the determination position setting unit 36 sets the determined first coordinate position Pf(n) as the determination coordinate position Pj(n).

If three or more distance measurement values Vr are not obtained in step S5, and if the first coordinate position Pf(n) determined in step S7 is inappropriate, it is determined in step S11 whether the movement value Vm(n) of the mobile device 1 has changed. If the movement value Vm(n) of the mobile device 1 changes, the second coordinate position determination processing is executed in step S12, and then the process proceeds to step S13. On the other hand, if the movement value Vm(n) of the mobile device 1 does not change in step S11, the process returns to step S1 without executing steps S12 to S16 described below.

In step S13, it is determined whether the second coordinate position Ps(n) is determined by the second coordinate position determination processing in step S12. If the second coordinate position Ps(n) is determined, the process proceeds to step S14, and if the second coordinate position Ps(n) is not determined, the process returns to step S1.

In step S14, the determination position setting unit 36 sets the second coordinate position Ps(n) determined in step S12 as the this-time determination coordinate position Pj(n), and the process proceeds to step S15. That is, if the set number or more of distance measurement values Vr are not obtained from the communication devices 23A to 23G in step S5, or if the first coordinate position Pf(n) determined in step S7 is inappropriate, the determination position setting unit 36 sets the determined second coordinate position Ps(n) as the determination coordinate position Pj(n).

If the determination coordinate position Pj(n) is set in step S10 or step S14, in-vehicle apparatus control processing described in detail below is executed in step S15, and then the number of determinations n of all data stored in the storage unit 39 is updated in step S16. That is, the n of the number of determinations is updated so that the original (n) is set to (n−1) and the original (n−1) is set to (n−2). Thereafter, the process returns to step S1 shown in FIG. 6, and steps S1 to S16 are repeatedly performed.

Next, the second coordinate position determination processing in steps S9 and S12 will be described.

Figure 8:
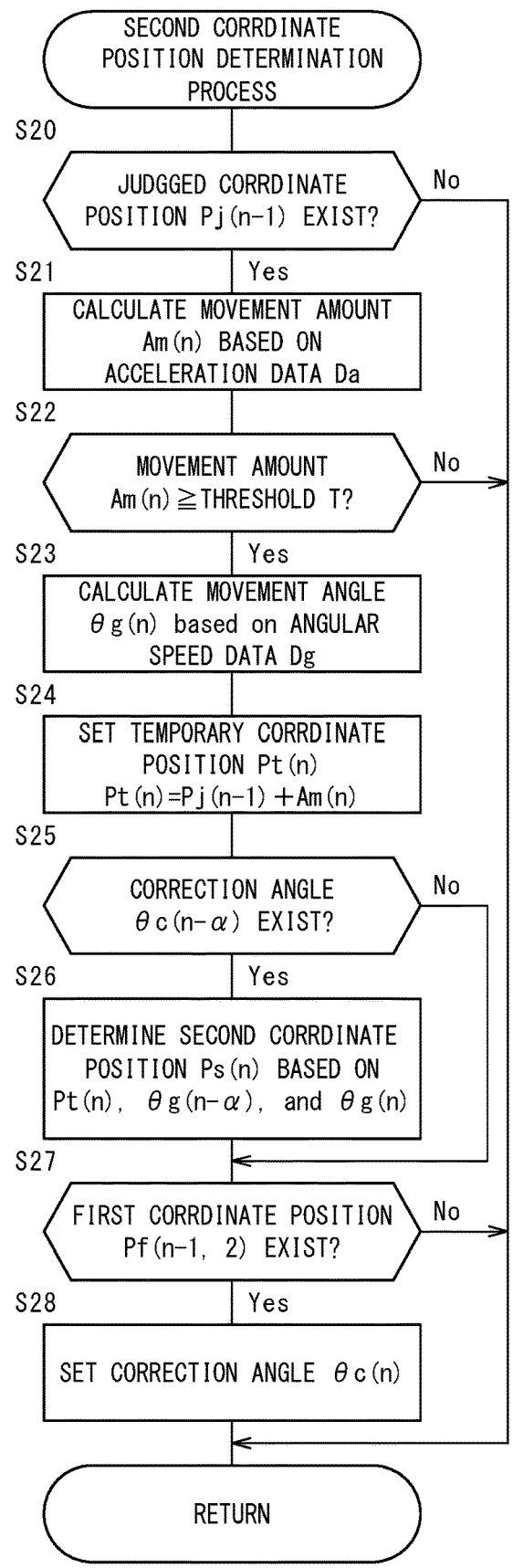
FIG. 8 is a flowchart showing the second coordinate position determination processing in FIG. 7.

Referring to FIG. 8, in the second coordinate position determination processing, in step S20, the sub-position determination unit 35 determines whether the last-time determination coordinate position Pj(n−1) set by the determination position setting unit 36 is present. If the determination coordinate position Pj(n−1) is present, the process proceeds to step S21. On the other hand, if the determination coordinate position Pj(n−1) is not present, the process returns without executing steps S21 to S28 described below, that is, without setting the second coordinate position Ps(n).

In step S21, the movement amount detection unit 33 calculates the movement amount Am(n) of the mobile device 1 from the input acceleration data Da, and in step S22, the sub-position determination unit 35 determines whether the movement amount Am(n) of the mobile device 1 is equal to or larger than the threshold value T. If the movement amount Am(n) of the mobile device 1 is equal to or larger than the threshold value T, the process proceeds to step S23. On the other hand, if the movement amount Am(n) of the mobile device 1 is less than the threshold value T, the process returns without executing steps S23 to S28 described below, that is, without setting the second coordinate position Ps(n).

After the movement angle detection unit 34 calculates the movement angle θg(n) of the mobile device 1 from the input angular velocity data Dg in step S23, the sub-position determination unit 35 adds the calculated movement amount Am(n) to the last-time determination coordinate position Pj(n−1) to set the temporary coordinate position Pt(n) in step S24.

Subsequently, in step S25, it is determined whether the latest correction angle θc(n−α) set before the this-time position determination is present. If the set latest correction angle θc(n−α) is present, the second coordinate position Ps(n) is determined based on the temporary coordinate position Pt(n), the correction angle θc(n−α), and the movement angle θg(n) in step S26, and the process proceeds to step S27. On the other hand, if the set latest correction angle θc(n−α) is not present, the determination of the second coordinate position Ps(n) in step S26 is not performed, and the process proceeds to step S27.

In step S27, it is determined whether the first coordinate positions Pf(n−1, 2) for two times determined before the this-time position determination, that is, the first coordinate position Pf(n−1) determined one time before and the first coordinate position Pf(n−2) determined two times before are present. If the first coordinate positions Pf(n−1, 2) for two times are present, the correction angle θc(n) is set in step S28, and the process returns. On the other hand, if the first coordinate positions Pf(n−1, 2) for two times are not present, the correction angle θc(n) is not set in step S28, and the process returns as it is.

Next, in-vehicle apparatus control processing in step S15 will be described.

Figure 9:
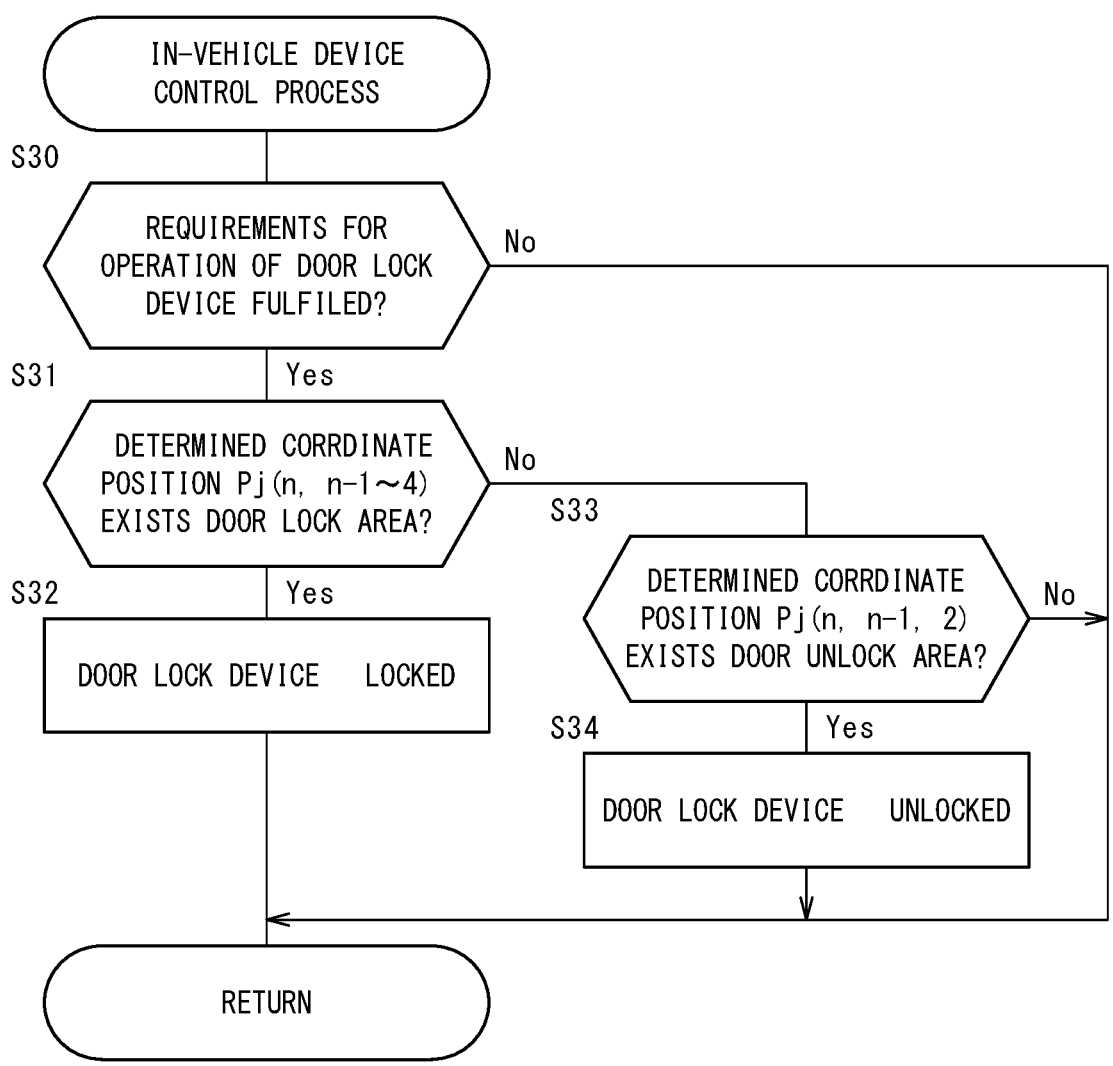
FIG. 9 is a flowchart showing the in-vehicle apparatus control processing in FIG. 7.

Referring to FIG. 9, in the in-vehicle apparatus control processing, the drive control unit 38 determines in step S30 whether the actuating condition of the door locking devices 16L and 16R is satisfied. If the actuating condition is satisfied, the process proceeds to step S31, and if the actuating condition is not satisfied, steps S31 to S34 described below are not performed, and the process returns as it is.

In step S31, it is determined whether all determination coordinate positions Pj(n, n−1 to 4) for five times are present in the door lock region 41. If even some thereof are not present in the door lock region 41, the process proceeds to step S33. On the other hand, if all thereof are present in the door lock region 41, the door locking devices 16L and 16R are actuated to be locked in step S32, and the process returns. That is, the actuating condition for locking the door locking devices 16L and 16R means that all the determination coordinate positions Pj(n, n−1 to 4) for five times are present in the door lock region 41, that is, the occupant continues to remain within the door lock region 41 for a set time or more.

In step S33, it is determined whether all determination coordinate positions Pj(n, n−1, 2) for three times are present in the door unlock region 42. If even some thereof are not present in the door unlock region 42, step S34 is not performed, and the process returns as it is. On the other hand, if all thereof are present in the door unlock region 42, the door locking devices 16L and 16R are actuated to be unlocked in step S34, and the process returns. That is, the actuating condition for unlocking the door locking devices 16L and 16R means that all the determination coordinate positions Pj(n, n−1, 2) for three times are present in the door unlock region 42, that is, the occupant continues to remain within the door unlock region 42 for a set time or more.

The vehicle control device 15 including the position determination device configured as described above has the following features.

When the number of distance measurement values Vr obtained from the communication results of the plurality of communication devices 23A to 23G is less than the set number, the main position determination unit 32 cannot determine the first coordinate position Pf(n), but the sub-position determination unit 35 can determine the second coordinate position Ps(n) based on the movement value Vm(n) detected by the movement detection unit 3 included in the mobile device 1. Therefore, even when the obstacle 100 that obstructs the wireless communication between the plurality of communication devices 23A to 23G and the mobile device 1 is present and the set number or more of the distance measurement values Vr cannot be obtained by the wireless communication, the determination coordinate position Pj(n) of the mobile device 1 can be determined.

A drive control unit 38 that controls the door locking devices 16L and 16R based on the determination coordinate position Pj(n) set by the determination position setting unit 36 is provided. Accordingly, since the occupant can control the door locking devices 16L and 16R by performing a predetermined motion without performing a physical key operation, convenience can be improved.

When the movement amount Am(n) detected by the movement detection unit 3 of the mobile device 1 is larger than the threshold value T, that is, when the mobile device 1 indicates that the mobile device 1 has moved, the sub-position determination unit 35 sets the temporary coordinate position Pt(n) obtained by adding the movement amount Am(n) to the last-time determination coordinate position Pj(n−1) set by the determination position setting unit 36. Accordingly, the determination accuracy of the second coordinate position Ps(n) by the sub-position determination unit 35 can be improved.

The sub-position determination unit 35 corrects the temporary coordinate position Pt(n) based on the latest correction angle θc(n−α) already set based on the two first coordinate positions Pf continuously determined by the main position determination unit 32 and the movement angle θg(n) detected by the movement detection unit 3 to determine the second coordinate position Ps(n). That is, the temporary coordinate position Pt(n) is corrected by adding the set latest correction angle θc(n−α) to the movement angle θg(n) of the mobile device 1 so that the axis of the vehicle 10 coincides with the axis of the mobile device 1, and the second coordinate position Ps(n) is determined. Accordingly, the determination accuracy of the second coordinate position Ps(n) by the sub-position determination unit 35 can be improved.

When the number of the distance measurement values Vr obtained from the communication results of the plurality of communication devices 23A to 23G is equal to or larger than a set number and the first coordinate position Pf(n) is appropriate, the determination position setting unit 36 sets the first coordinate position Pf(n) as the determination coordinate position Pj(n). Since the first coordinate position Pf(n) determined by the main position determination unit 32 is more accurate than the second coordinate position Ps(n) determined by the sub-position determination unit 35 based on the movement value Vm(n) detected by the movement detection unit 3, the position determination accuracy of the mobile device 1 with respect to the vehicle 10 can be improved.

When the number of the distance measurement values Vr obtained from the communication results of the plurality of communication devices 23A to 23G is less than the set number, that is, when the set number or more of the distance measurement values Vr capable of determining the position of the mobile device 1 with high accuracy cannot be obtained, the determination position setting unit 36 sets the second coordinate position Ps(n) as the determination coordinate position Pj(n). Although the door locking devices 16L and 16R cannot be controlled unless the determination coordinate position Pj(n) is set due to communication failure, since the second coordinate position Ps(n) is set as the determination coordinate position Pj(n) in such a case, it is possible to prevent the inconvenience that the door locking devices 16L and 16R cannot be controlled.

When determining that the this-time first coordinate position Pf(n) determined by the main position determination unit 32 is inappropriate, that is, when the first coordinate position Pf(n) has low accuracy, the determination position setting unit 36 sets the second coordinate position Ps(n) as the determination coordinate position Pj(n). Therefore, since the false determination of the determination coordinate position Pj(n) based on the improper first coordinate position Pf(n) can be suppressed, the position of the mobile device 1 can be determined with high accuracy.

The determination position setting unit 36 determines whether the first coordinate position Pf(n) is appropriate based on the last-time determination coordinate position Pj(n−1) set by the determination position setting unit 36 and the this-time first coordinate position Pf(n). That is, the appropriateness/inappropriateness of the this-time first coordinate position Pf(n) is determined depending on whether the moving speed of the occupant carrying the mobile device 1 indicates an abnormal state that cannot be normal. Therefore, the appropriateness/inappropriateness of the this-time first coordinate position Pf(n) can be determined with high accuracy.

It should be noted that the present invention is not limited to the configuration of the above embodiment, and various modifications are possible.

Figure 10:
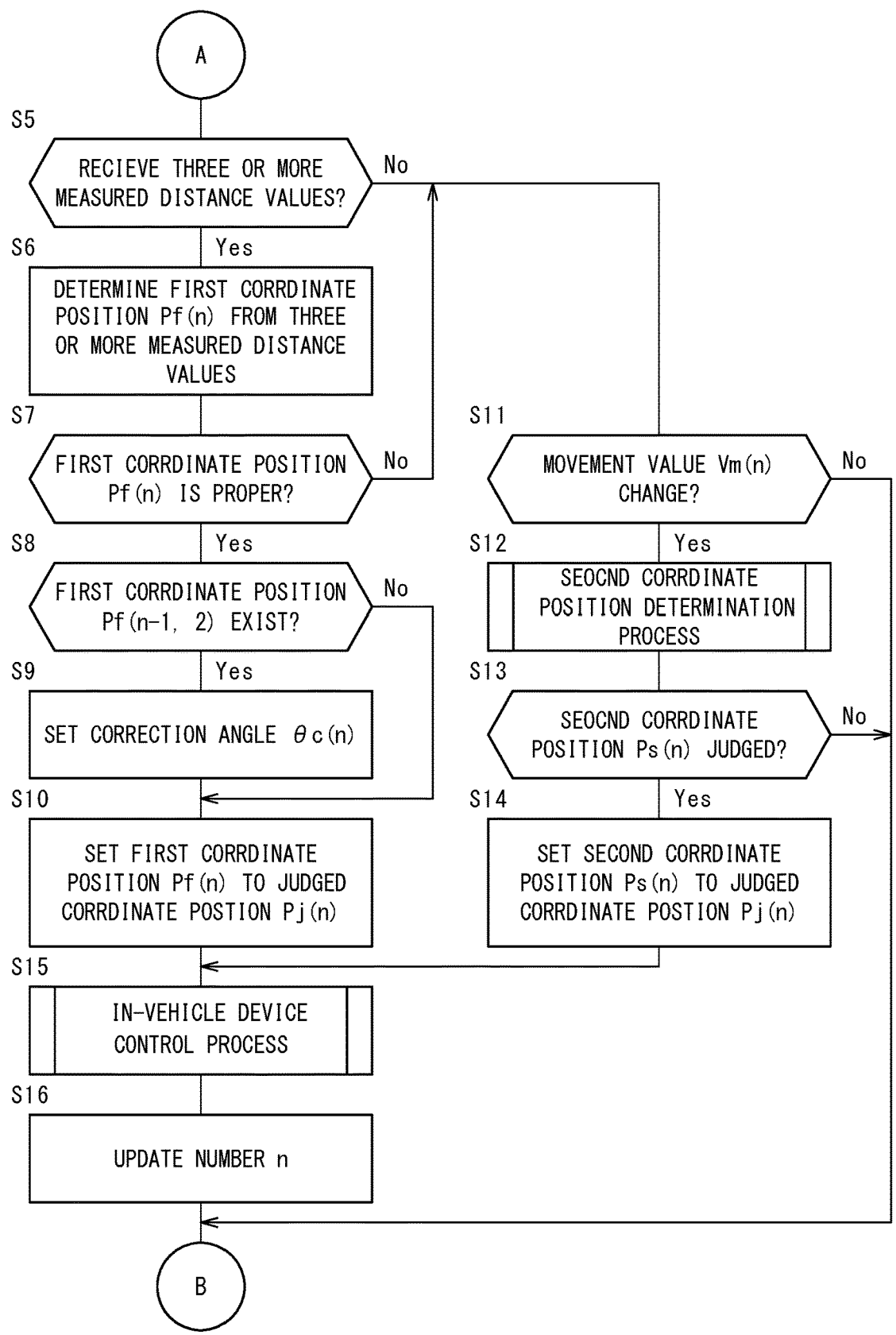
FIG. 10 is a flowchart following FIG. 6 showing a modification of the position determination processing by the control unit.

For example, steps S5 to S16 of the position determination processing may be those shown in FIG. 10. Steps S5 to S16 shown in the embodiment in FIG. 7 described above are different from steps S5 to S16 of the modification shown in FIG. 10 only in steps S8 and S9, and the other steps S5 to S7 and S10 to S16 are the same.

Specifically, steps S5 to S7 are performed as in the above embodiment, and if it is determined in step S7 that the first coordinate position Pf(n) is appropriate, it is determined in step S8 whether there are first coordinate positions Pf(n−1, 2) for two times determined before the this-time position determination, that is, the first coordinate position Pf(n−1) determined one time before and the first coordinate position Pf(n−2) determined two times before. If the first coordinate positions Pf(n−1, 2) for two times are present, the correction angle θc(n) is set in step S9, and the process proceeds to step S10. On the other hand, if the first coordinate positions Pf(n−1, 2) for two times are not present, the correction angle θc(n) is not set in step S9, and the process proceeds to step S10. Even in this case, the same actions and effects as those of the above embodiment can be obtained.

The in-vehicle apparatus controlled by the drive control unit 38 may be a door opening/closing device that opens and closes each of the left and right rear doors 12L and 12R, an engine, or a welcome light.

The movement detection unit 3 of the mobile device 1 may transmit information about the movement value Vm(n) including the movement amount Am(n) and the movement angle θg(n) to any one of the plurality of communication devices 23A to 23G by BLE communication (second wireless communication). That is, any one of the plurality of communication devices 23A to 23G may receive the information on the movement value Vm(n) from the mobile device 1.

The position determination device may be incorporated in a house door control device that locks and unlocks a house key, not limited to the vehicle 10.

What is claimed is:

1. A position determination device comprising:
a communication unit including a plurality of communication devices configured to perform wireless communication with a mobile terminal including a movement detection unit configured to detect a movement value including a movement amount and a movement angle, each of the plurality of communication devices being configured to repeatedly perform first wireless communication for detecting a distance measurement value with respect to the mobile terminal, at least one of the plurality of communication devices being configured to repeatedly perform second wireless communication for receiving the movement value;
a main position determination unit configured to determine a first coordinate position, which is a position of the mobile terminal, based on a plurality of distance measurement values obtained by the first wireless communication;
a sub-position determination unit configured to determine a second coordinate position, which is a position of the mobile terminal, based on the movement value obtained by the second wireless communication; and
a determination position setting unit configured to set any one of the first coordinate position and the second coordinate position as a determination coordinate position that is a current position of the mobile terminal.

2. The position determination device according to claim 1, further comprising a drive control unit configured to control an in-vehicle apparatus included in a vehicle based on the determination coordinate position set by the determination position setting unit.

3. The position determination device according to claim 1, wherein when the movement amount obtained by the second wireless communication is larger than a predetermined threshold value, the sub-position determination unit sets a temporary coordinate position obtained by adding the movement amount to a last-time determination coordinate position set by the determination position setting unit.

4. The position determination device according to claim 3, wherein the sub-position determination unit determines the second coordinate position by correcting the temporary coordinate position based on a correction angle set based on two of the first coordinate positions continuously determined by the main position determination unit before this-time position determination and the movement angle detected by the movement detection unit.

5. The position determination device according to claim 1, wherein when the number of the distance measurement values obtained by the first wireless communication is equal to or larger than a set number and a this-time first coordinate position determined by the main position determination unit is appropriate, the determination position setting unit sets the this-time first coordinate position as the determination coordinate position.

6. The position determination device according to claim 1, wherein when the number of the distance measurement values obtained by the first wireless communication is less than a set number, the determination position setting unit sets the second coordinate position as the determination coordinate position.

7. The position determination device according to claim 1, wherein when determining that this-time first coordinate position determined by the main position determination unit is inappropriate, the determination position setting unit sets the second coordinate position as the determination coordinate position.

8. The position determination device according to claim 7, wherein the determination position setting unit determines whether the this-time first coordinate position is appropriate based on a last-time determination coordinate position set by the determination position setting unit and the this-time first coordinate position.

9. The position determination device according to claim 2, wherein when the movement amount obtained by the second wireless communication is larger than a predetermined threshold value, the sub-position determination unit sets a temporary coordinate position obtained by adding the movement amount to a last-time determination coordinate position set by the determination position setting unit.

10. The position determination device according to claim 9, wherein the sub-position determination unit determines the second coordinate position by correcting the temporary coordinate position based on a correction angle set based on two of the first coordinate positions continuously determined by the main position determination unit before this-time position determination and the movement angle detected by the movement detection unit.

11. The position determination device according to claim 2, wherein when the number of the distance measurement values obtained by the first wireless communication is equal to or larger than a set number and a this-time first coordinate position determined by the main position determination unit is appropriate, the determination position setting unit sets the this-time first coordinate position as the determination coordinate position.

12. The position determination device according to claim 2, wherein when the number of the distance measurement values obtained by the first wireless communication is less than a set number, the determination position setting unit sets the second coordinate position as the determination coordinate position.

13. The position determination device according to claim 2, wherein when determining that this-time first coordinate position determined by the main position determination unit is inappropriate, the determination position setting unit sets the second coordinate position as the determination coordinate position.

14. The position determination device according to claim 13, wherein the determination position setting unit determines whether the this-time first coordinate position is appropriate based on a last-time determination coordinate position set by the determination position setting unit and the this-time first coordinate position.

\* \* \* \* \*